United States Patent [19]
Michel

[11] 4,016,230
[45] Apr. 5, 1977

[54] METHOD OF FORMING AN ARTICLE INCLUDING REINFORCING ELEMENTS ENCAPSULATED IN THERMOPLASTIC MATERIAL

[75] Inventor: Peter Michel, Wembley, England
[73] Assignee: Brigend Investments Limited, London, England
[22] Filed: Jan. 14, 1975
[21] Appl. No.: 540,769
[30] Foreign Application Priority Data
  Apr. 29, 1974  United Kingdom ............ 18768/74
[52] U.S. Cl. .................................. 264/89; 264/92; 264/274; 264/278; 425/388
[51] Int. Cl.² ...................... B29C 17/04; B29D 3/02
[58] Field of Search .................. 264/89, 90, 92, 93, 264/274, 278; 425/504, 388

[56] References Cited
UNITED STATES PATENTS

| | | | |
|---|---|---|---|
| 2,361,348 | 10/1944 | Dickson et al. .................. | 264/278 |
| 3,238,287 | 3/1966 | Chapman ..................... | 264/278 X |
| 3,875,280 | 4/1975 | Story ................................. | 264/92 |

Primary Examiner—Jan H. Silbaugh
Attorney, Agent, or Firm—Sughrue, Rothwell, Mion, Zinn & Macpeak

[57] ABSTRACT

The invention relates to the production of an article such as a pallet by a vacuum moulding technique in which a substantially two dimensional array of reinforcement elements is supported above a vacuum forming table on a first section or sections of said table movable upwards from a second section or sections of said table, a hot sheet of thermoplastic material being positioned over said reinforcement array and drawn down and around underneath said reinforcement by the application of a vacuum applied through said second section or sections, said first section or sections then being retracted to a position substantially flush with said second section or sections once said thermoplastic material is capable of supporting said reinforcement above said second section or sections and said vacuum then drawing said thermoplastic material down and around underneath said reinforcement elements above said first section or sections.

5 Claims, 7 Drawing Figures

METHOD OF FORMING AN ARTICLE INCLUDING REINFORCING ELEMENTS ENCAPSULATED IN THERMOPLASTIC MATERIAL

The invention relates to the production of a product such as a pallet by a vacuum moulding technique in which a substantially two dimensional array of reinforcement is encapsulated by vacuum forming a thermoplastic sheet around the reinforcement.

It is known to form a pallet by supporting elongate steel reinforcement on pegs fixed to the top of a vacuum forming table, and superimposing a hot sheet of thermoplastic material so that the vacuum draws the hot sheet both around and under the reinforcement. The parts of the hot sheet drawn together under the reinforcement are thus fused together to encapsulate the reinforcement. However, encapsulation of the reinforcement is not complete because the supporting pegs prevent the hot thermoplastic material being drawn underneath the steel reinforcement at the points where the reinforcement is supported. This has the disadvantage that the reinforcement is exposed and may be subject to corrosion under atmospheric conditions, and cavities, previously occupied by the forming table supports, remain in the surface of the moulded product. Dirt may accumulate in the cavities and if, for example, the moulded product is a pallet to be used in an hygenic environment for food handling, the reinforcement corrosion and/or dirty cavities at the load handling surface of the pallet are most undesirable.

In order to overcome this problem, and in accordance

With the present invention, the vacuum forming table is formed in at least two separate sections which are movable relatively to one another in the upright direction perpendicularly to the plane of the table, whereby in use the reinforcement is first supported on a first section or sections which are at a higher level than a second section or sections, vacuum is applied to the second section or sections of the table to draw an overlying sheet of hot thermoplastic material down around the reinforcement above the second section or sections, and when the thermoplastic material is capable of supporting the encapsulated parts of the reinforcement above the second section or sections, the first section or sections are lowered relatively to the second section or sections and vacuum is then applied through the first section or sections to draw the thermoplastic material down around the remainder of the reinforcement above the first section or sections of the table.

The first sections of the table may each comprise a bar extending across the width of the table, the bars being fully retractable into the remainder of the table, whereby in use, the first sections are retracted soon after the vacuum has been created and when sufficient thermoplastic material has filled the gap between the underside of the reinforcement and the top of the forming table for the plastics material to take over the supporting function for the reinforcement. This results in total encapsulation of the reinforcement and enables, for example, the manufacture of a pallet having a smooth deck of plastics material uninterrupted by areas where steel reinforcement is exposed.

Two examples of the use and construction of a vacuum forming table according to the invention will now be described with reference to the accompanying diagrammatic drawings, in which.

Figure 1:
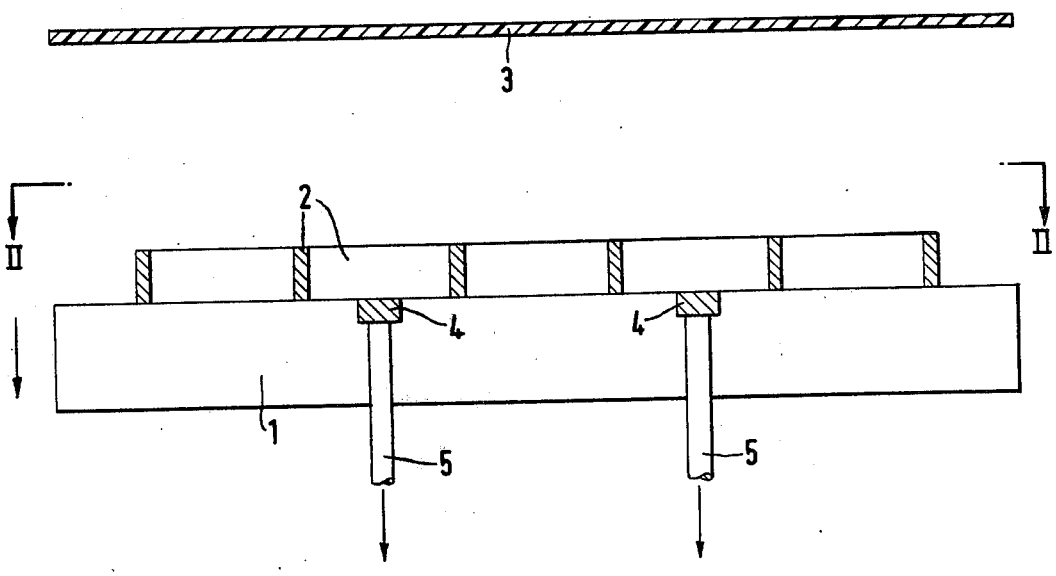
FIG. 1 is a vertical section through a vacuum forming table showing a reinforcement resting thereon and a hot sheet of thermoplastic material superposed over the reinforcement.
Figure 3:
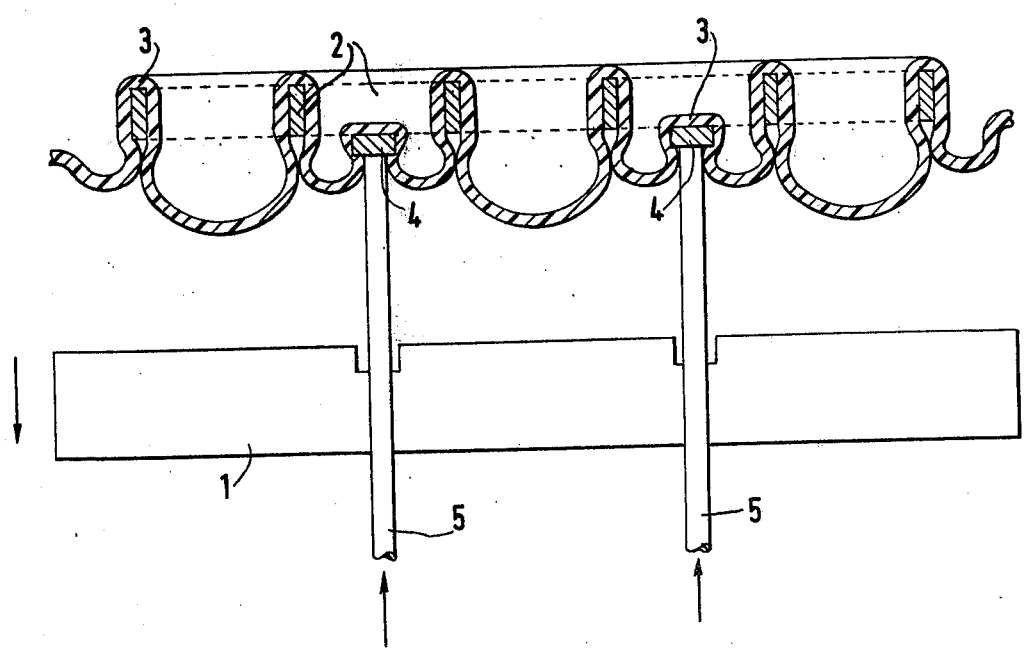
Figure 2:
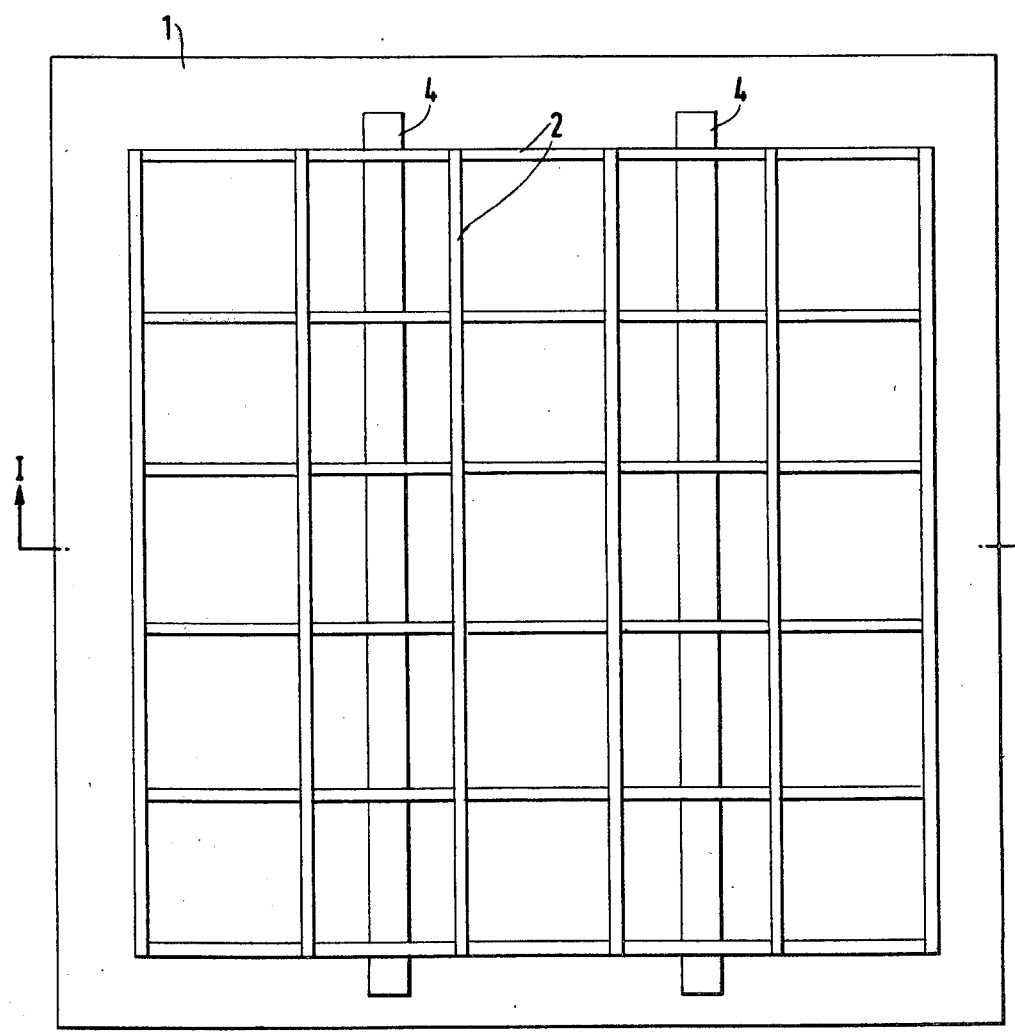
FIG. 2 is a plan view of the apparatus shown in FIG. 1, along the line II—II in FIG. 1.
Figure 4:
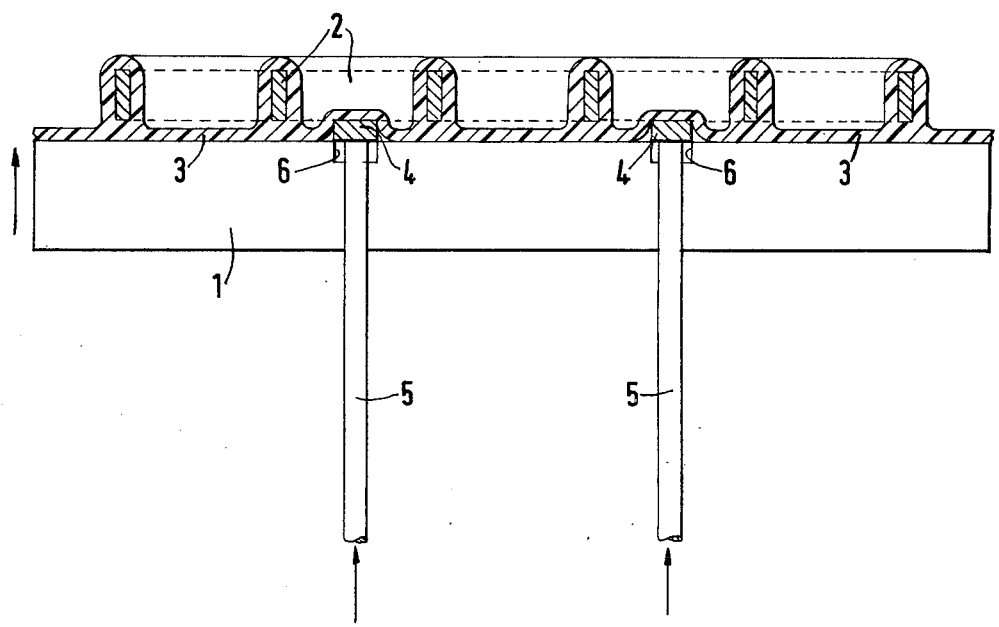
Figure 5:
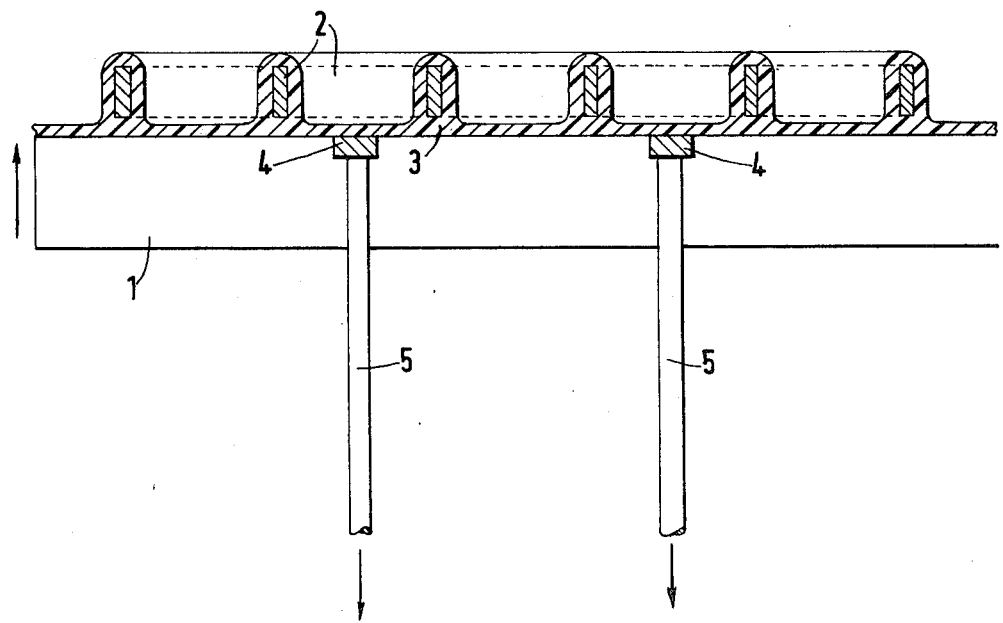
Figure 6:
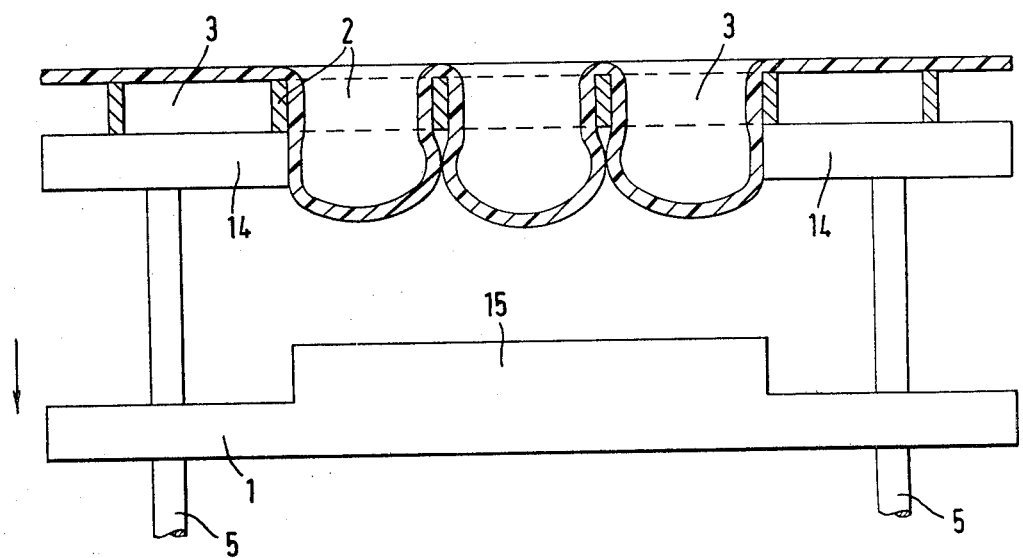
Figure 7:
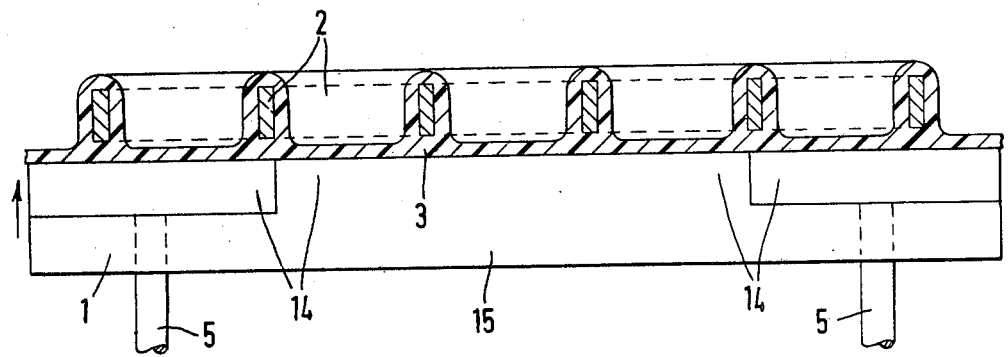

FIGS. 3, 4 and 5 are similar views to FIG. 1 showing first, second, and third stages of the process respectively, and, FIG. 6 and 7 are sections through a second vacuum forming table corresponding to the stages shown in FIGS. 3 and 5.

In FIG. 1 there is shown a vacuum forming table 1 on which rests rectangular-sectioned steel reinforcement 2 which is to be encapsulated by a thermoplastic sheet of material 3 to form a pallet. The vacuum forming table incorporates two elongate bars 4 which are movable relatively to the remainder of the table in a perpendicular direction by means of rods 5 which are raisable by jacks (not shown).

To initiate the encapsulation process the bars 4 are raised as shown in FIG. 3 until the reinforcement elements 2 abut the underneath of the thermoplastics sheet 3. A vacuum is then applied through the vacuum forming tabel 1 to draw the thermoplastic sheet 3 down and around the reinforcement members 2. In order to make forming of the thermoplastic sheet possible it is preheated before being positioned over the reinforcement members on the vacuum forming table. As can be seen in FIG. 3 loops of the hot thermoplastic material are formed below the reinforcement 2 and in order that the thermoplastic material can be formed into a flat surface to form the top of a pallet the bars 4 are lowered to the position shown in FIG. 4 so that the thermoplastics material 3 moulds itself against the planar surface of the remaining sections of the vacuum forming table.

However for a short length of time, the thermoplastics material 3 is unable to support the weight of the reinforcement and so the bars are retained in the position as shown in FIG. 4 until such time as the reinforcement can be at least partially supported by the thermoplastics material. The bars are then withdrawn into recesses 6 so that the tops of the bars lie flush with the remainder of the vacuum forming table surface. The continued application of the vacuum through the vacuum forming table draws the final portions of the thermoplastics material down onto the vacuum forming table surface to complete the encapsulation process. Depending on the time at which the bars are withdrawn so the reinforcement will sink to a greater or lesser extent into the thermoplastic material.

Alternatively as shown in FIGS. 6 and 7 the forming table may be formed in say three sections; two end sections 14 and a central section 15. The end sections 14 are initially raised relatively to the central section 15, on rods 5 raisable by jacks (not shown), to support the opposite edges of the two dimensional reinforcement 2 to cause encapsulation of the central part of the reinforcement. The end sections 14 of the table are then lowered (FIG. 7) so that their upper surfaces are co-planar with that of the central section 15 and vacuum is then applied through the end sections 14 as well to complete the encapsulation of the reinforcement. In this case the end sections of the table will provide the first sections and the central section will provide the second section.

A common source of vacuum may be applied to the sections, the vacuum being applied to the first section or sections when conduits in the first and second sections come into alignment with one another upon lowering of the first section or sections relatively to the second section or sections.

Some means may be necessary to accelerate the cooling and setting of the thermoplastic material which has encapsulated the part of the reinforcement above the second section or sections of the forming table so that the thermoplastic material above the first section or sections of the forming table has not cooled too much before it is subsequently drawn around the parts of the reinforcement above the first section or sections of the forming table Such cooling may be provided by chilling the second section or sections of the forming table or by applying cooling water sprays to the part of the product above the second section or sections of the table after encapsulation of the corresponding part of the reinforcement. Sagging of the thermoplastic material above the first section or sections of the forming table prior to vacuum being applied through this section or sections may be inhibited by applying a positive pressure to the underside of this part of the thermoplastic material, either through the first section or sections of the forming table or otherwise.

I claim:

1. A method of forming a substantially two dimensional array of reinforcement elements completely encapsulated in a thermoplastic material, comprising the steps of: supporting said reinforcement array above a vacuum forming table on a first section of said table movable upwards from a remaining second section of said table, said first section extending completely across said table, positioning a sheet of hot thermoplastic material over said reinforcement array, applying a vacuum through said remaining second section of said table to draw said thermoplastic material down and around underneath said reinforcement above said second section of said table, retracting said first section to a position substantially flush with said second section once said thermoplastic material is capable of supporting said reinforcement above said second section, whereby said reinforcement is supported above said first and second sections by said thermoplastic material which is in contact with said second section, and then applying a vacuum through said first section to draw said thermoplastic material around and underneath said reinforcement above said first section of said table.

2. A method according to claim 1 wherein said first section comprises a pair of horizontal bars.

3. A method according to claim 2 wherein the horizontal bars are substantially parallel.

4. A method according to claim 1, comprising the further step of cooling said thermoplastic material above said second section after encapsulation of the corresponding part of said reinforcement.

5. A method according to claim 1 wherein the first section of said table comprises a pair of elongated platforms positioned substantially parallel to each other on opposite sides of said second section.

* * * * *